US007918149B1

(12) United States Patent
Bertini

(10) Patent No.: US 7,918,149 B1
(45) Date of Patent: Apr. 5, 2011

(54) MACHINE SLIDE TOOL ASSEMBLY AND A DRIVE MECHANISM THEREFOR

(76) Inventor: Millo Bertini, Trumbull, CT (US)

( * ) Notice: Subject to any disclaimer, the term of this patent is extended or adjusted under 35 U.S.C. 154(b) by 475 days.

(21) Appl. No.: 12/072,549

(22) Filed: Feb. 27, 2008

(51) Int. Cl.
*B23B 21/00* (2006.01)
*B23B 13/12* (2006.01)

(52) U.S. Cl. ........................................... 82/132; 82/137

(58) Field of Classification Search .................... 82/132, 82/137, 138, 173; 269/20, 32, 35, 27; 279/4.12, 279/117
See application file for complete search history.

(56) References Cited

U.S. PATENT DOCUMENTS 3,576,151 A * 4/1971 Sendoykas ........................ 92/24
4,707,013 A * 11/1987 Vranish et al. ............ 294/119.1
5,163,729 A * 11/1992 Borcea et al. .............. 294/119.1
6,309,003 B1 * 10/2001 Bertini ....................... 294/119.1
6,428,071 B2 * 8/2002 Bertini ....................... 294/119.1

* cited by examiner

*Primary Examiner* — Will Fridie, Jr.

(74) *Attorney, Agent, or Firm* — Fattibene and Fattibene, LL; Paul A. Fattibene

(57) ABSTRACT

A machine slide tool assembly and a drive mechanism that includes a slide plate slideably mounted on guide members connected between opposed end supports and which slide plate is reciprocally driven by a drive assembly. The drive assembly includes a piston and cylinder arrangement disposed between the opposed end supports wherein a piston is displaceable within the cylinder by fluid pressure alternatively acting on the opposed ends of the piston, and which piston includes a gear wheel rotatably journaled thereto which is disposed in meshing relationship with a gear rack connected to the slide plate whereby the reciprocating motion of the piston is transmitted to the slide plate for enhancing the linear displacement of the slide plate relative to the linear displacement of the piston within its cylinder.

12 Claims, 7 Drawing Sheets

22
25
25
23
24
45
34
44
31
28
33
32
27
27
21
21A
26

36
34
38
39
36B
42
41
40
40B
37
45
44
40A
36A
47
47
45A
46
40A
46
41
35
42

MACHINE SLIDE TOOL ASSEMBLY AND A DRIVE MECHANISM THEREFOR

FIELD OF INVENTION

A machine slide tool assembly and more specifically to a machine slide tool assembly having a drive mechanism for enhancing the linear displacement of the slide within a given footprint of the slide assembly.

BACKGROUND OF THE INVENTION

Heretofore, the slide assembly of a given machine tool included a slide plate reciprocally mounted on suitable guides for reciprocal movement there along. The drive mechanism to effect the reciprocating movement of the slide plate along the guides generally consists of a piston and cylinder drive, actuated by a fluid medium, e.g. compressed air or hydraulic fluid. The arrangement was such that upon the actuation of the piston and cylinder drive, the slide plate associated therewith is reciprocated along its guides only a distance equal to the stroke of the associated piston's displacement within the cylinder. Thus the maximum reciprocal distance for such currently known machine tool slides is limited to the displacement distance of the piston within the cylinder. Such known machine tool slides were capable of achieving only a linear displacement of the slide relative to that of the piston displacement in a one-to-one ratio.

SUMMARY OF THE INVENTION

An object of the invention is to provide a slide assembly for use with a machine tool having a piston and cylinder drive arrangement whereby the linear displacement of the slide is greater than the linear displacement of the piston within its chamber.

Another object of this invention is to provide an improved piston and cylinder drive mechanism for effecting the drive of a machine tool slide whereby the linear displacement of the slide is substantially enhanced without increasing the overall footprint of a given slide assembly.

Another object of the invention is to provide a piston and cylinder drive mechanism whereby a linear displacement of the associated piston within its cylinder is translated to an associated mechanism in a manner that enhances the linear displacement of its associated mechanism.

Another object of this invention is to provide a piston and cylinder drive mechanism for a machine tool slide plate wherein linear displacement of the slide plate is double that of the piston displacement within its cylinder.

Another object is to provide an improved machine tool slide assembly having a piston and cylinder drive mechanism which is relatively simple in structure, easy to fabricate, and positive in operation.

The foregoing objects and other features and advantages are obtained by a machine tool slide assembly that includes a slide reciprocally mounted on suitable guides; and having a piston and cylinder drive mechanism operatively connected to the slide to impart thereto a reciprocating movement as the piston and cylinder drive is actuated. The actuating medium for such piston and cylinder drive mechanism may be compressed air or a hydraulic fluid.

The slide or slide plate is slidably mounted on a pair of parallel spaced apart guide rails or members mounted between a pair of opposed end blocks or supports. Disposed between the end blocks or supports is a housing having a bore extending there through to define a cylinder chamber. If desired, a tubular liner or cylinder may be positioned within the bore to define the cylinder chamber of the piston and cylinder drive mechanism.

Slidably disposed within the cylinder chamber is a reciprocating piston in the form of a freely reciprocating piston. The piston is formed as a rod with suitable sealing means circumscribing the opposed ends of the piston.

In accordance with this invention, the piston is provided with a slotted opening intermediate to the opposed ends thereof for receiving a gear rotatably journaled thereto. The arrangement is such that the outer periphery of the gear is provided with radially outwardly extending gear teeth that project beyond the outer surface of the piston to engage a complementary gear rack connected to the slide to move therewith. A stationary complementary gear rack is fixedly connected to a lower surface of the housing which is also in meshing relationship with the gear. The opposed ends of the cylinder chamber are connected in communication with a port opening formed in the end support for permitting an actuating fluid to flow into and out of the opposed ends of the cylinder to impart a reciprocating movement to the piston within the cylinder chamber. As the slide gear rack is disposed in meshing relationship to the gear, the arrangement is such that as the piston is displaced linearly within the cylinder chamber in one direction or the other, the slide plate is also linearly displaced accordingly wherein the linear distance traveled by the slide is enhanced by the simultaneous linear displacement of the piston and the associated gear within the cylinder chamber, and the angular rotation of the gear relative to its associated racks. As illustrated and described herein, the linear displacement of the slide plate is twice that of the displacement of the piston within its cylinder chamber. Thus, the present invention allows for an enhanced linear displacement of the slide to be achieved within the same slide footprint as that of a conventionally piston actuated slide wherein the linear displacement of the slide is limited to the stroke of the piston only.

DETAILED DESCRIPTION

Figure 8:
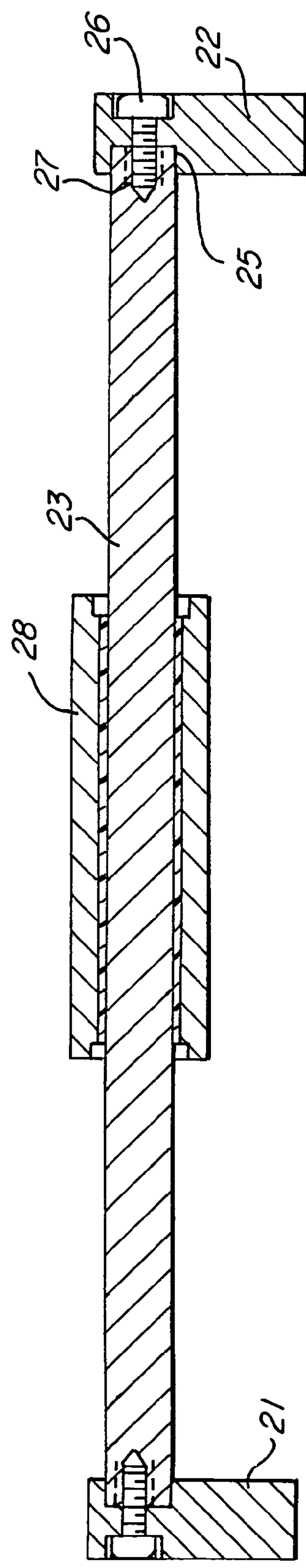
FIG. 8 is a sectional side view taken on line 8-8 on FIG. 2.
Figure 9:
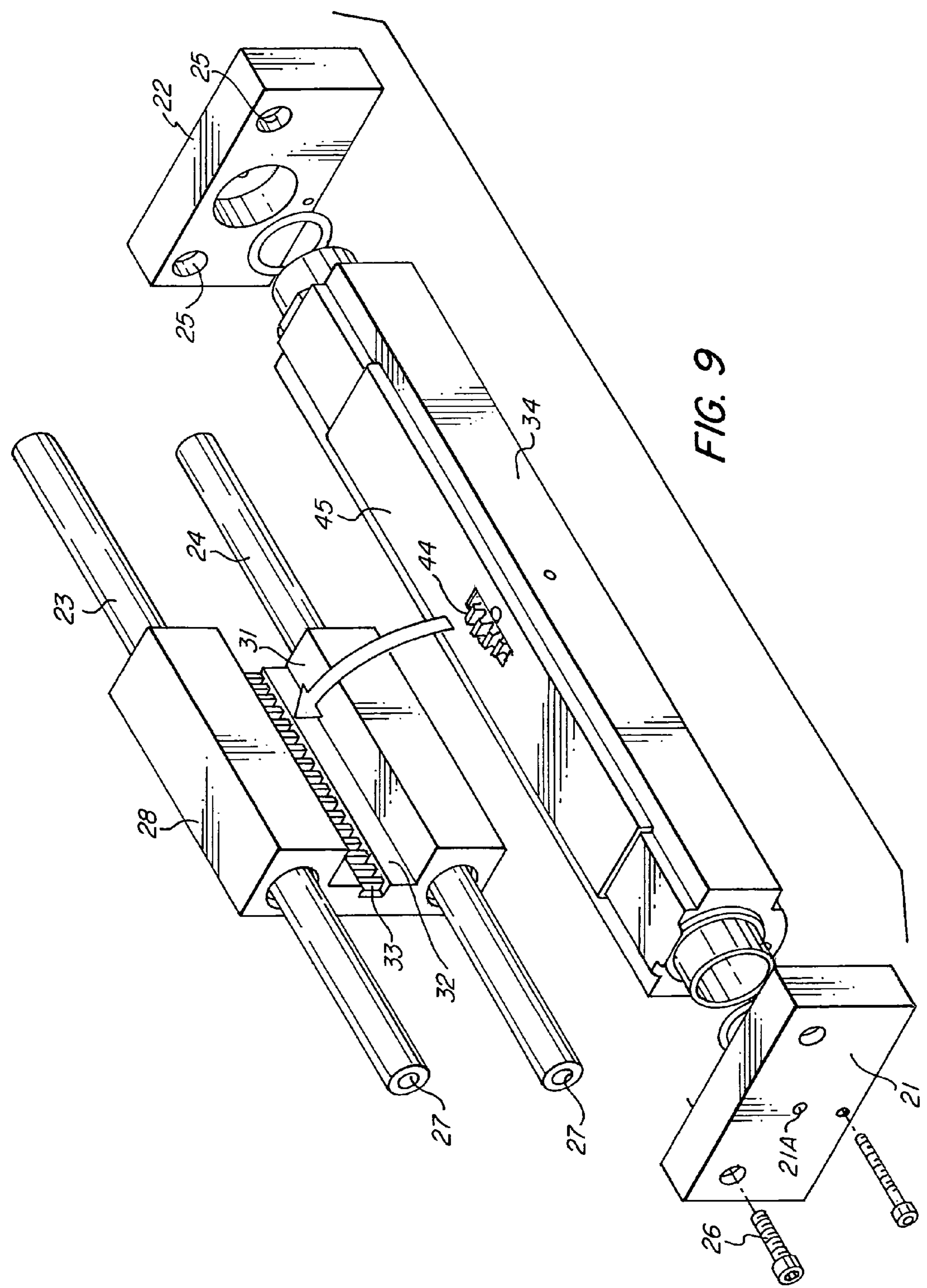
FIG. 9 is a partial exploded perspective view of the slide assembly embodying the invention and the associated cylinder housing.

Referring to the drawing there is illustrated an embodiment of a machine tool slide assembly (20) that incorporates the present invention. As shown, the machine tool assembly (20) includes a pair of opposed end supports or blocks (21, 22) having interconnected therebetween a pair of spaced apart guide members, which are illustrated in the forms of two guide rods (23, 24). As best seen in FIGS. 8 and 9, the respective end supports or blocks (21, 22) are provided with counter bores (25) for receiving and supporting therein the opposed end portion of the associated guide rod (23, 24) connected thereto. A suitable screw or bolt (26) secures the respective end portion of the guide rods (23, 24) to its corresponding associated end block (21, 22). As noted in FIG. 9, the respective end portions of the guide rods (23, 24) are provided with a tapped hole (27) for receiving a fastening screw or bolt (26) for securing the same to the end block or support (21, 22).

Slidably supported on its respective guide rods for reciprocal movement therealong is a slide or slide block (28). As shown in FIG. 9, the slide (28) is in the form of a block (28A) having a pair of parallel bores (29, 30) through which the guide rods (23, 24) extend respectively. As best seen in FIG. 9, the underside of the block is provided with a groove (31). Secured to the roof (32) of the groove (31) is a gear rack (33).

Figure 10:
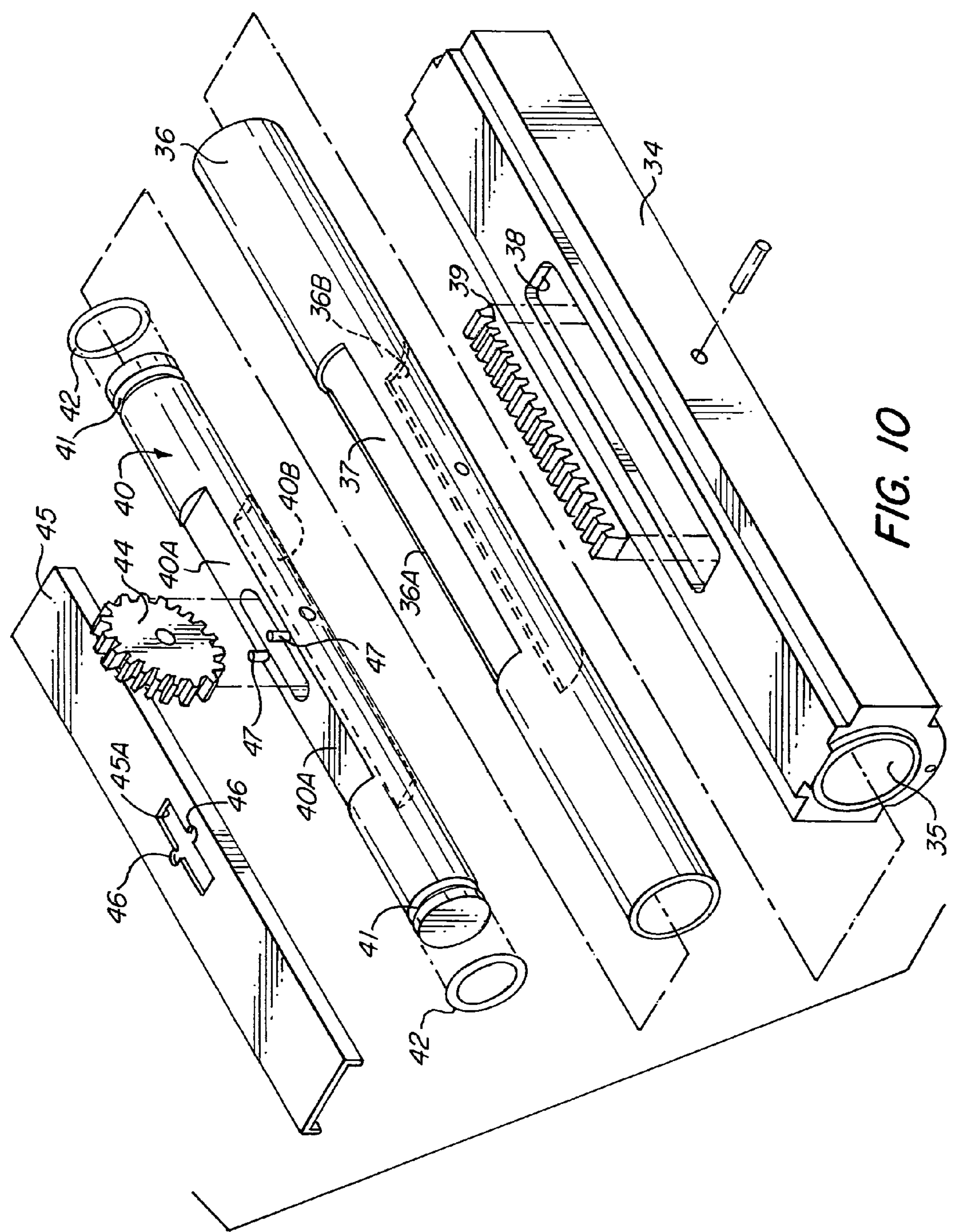
FIG. 10 is an exploded perspective view of the cylinder housing and its associated components.

Interconnected between the end blocks or supports (21, 22) is a cylinder housing (34). As noted in FIGS. 1 to 6, the cylinder housing (34) is centrally disposed between the opposed guide rods so as to extend through the slide groove (31). The housing (34) is provided with a through bore (35). In the illustrated embodiment, a tube or cylinder (36) defining a piston chamber (37) is fitted in the housing bore (35). As best seen in FIG. 10, the tube or cylinder (36) forming the cylinder chamber (37) is provided with an upper and lower slotted opening (36A, 36B) which are arranged to be disposed in alignment with the slotted opening (38) of the cylinder housing (35). Secured to the bottom of the housing (34) between the opposed ends thereof is a stationary rack (39).

Slidably disposed within this piston chamber (37) is an elongated piston (40) which is in the form of a rod. Midway between the opposed ends of the piston (40) there is provided an upper and lower cutout or undercut (40A, 40B). The opposed ends of the piston are provided with a circumscribed sealing groove (41) for seating a sealing ring (42) therein.

In accordance with this invention, the piston (40) is provided with a center slotted opening (43) extending therethrough. Rotatably journaled within the center slotted opening (43) is a gear wheel (44). The arrangement is such that in the assembled position of the component parts, the teeth of the gear wheel (44) are disposed in meshing relationship with the teeth of the upper slide rack (33) and the teeth of the lower stationary housing rack (39).

Figure 1:
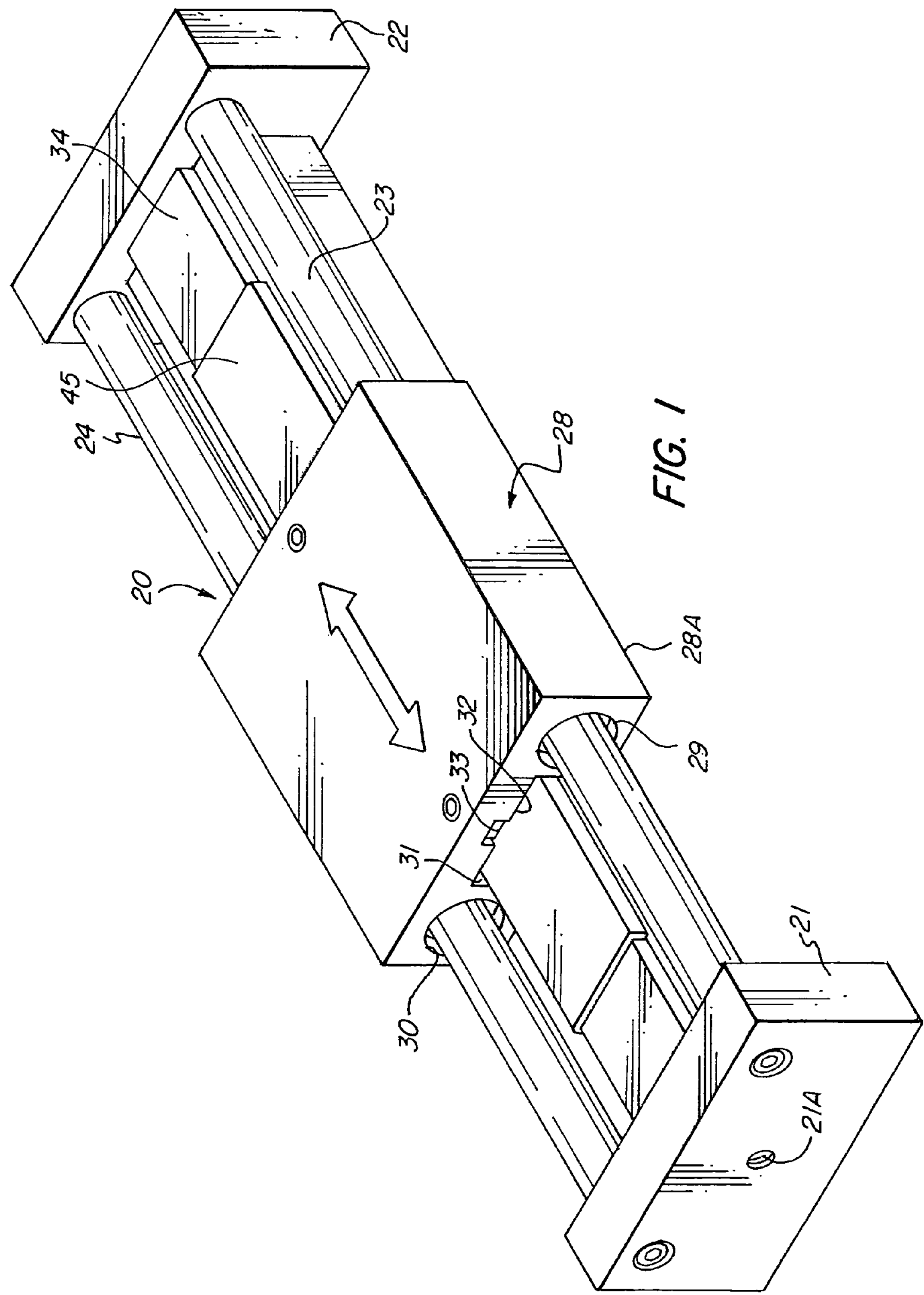
FIG. 1 is a perspective view of a machine tool slide assembly embodying this invention.
Figure 2:
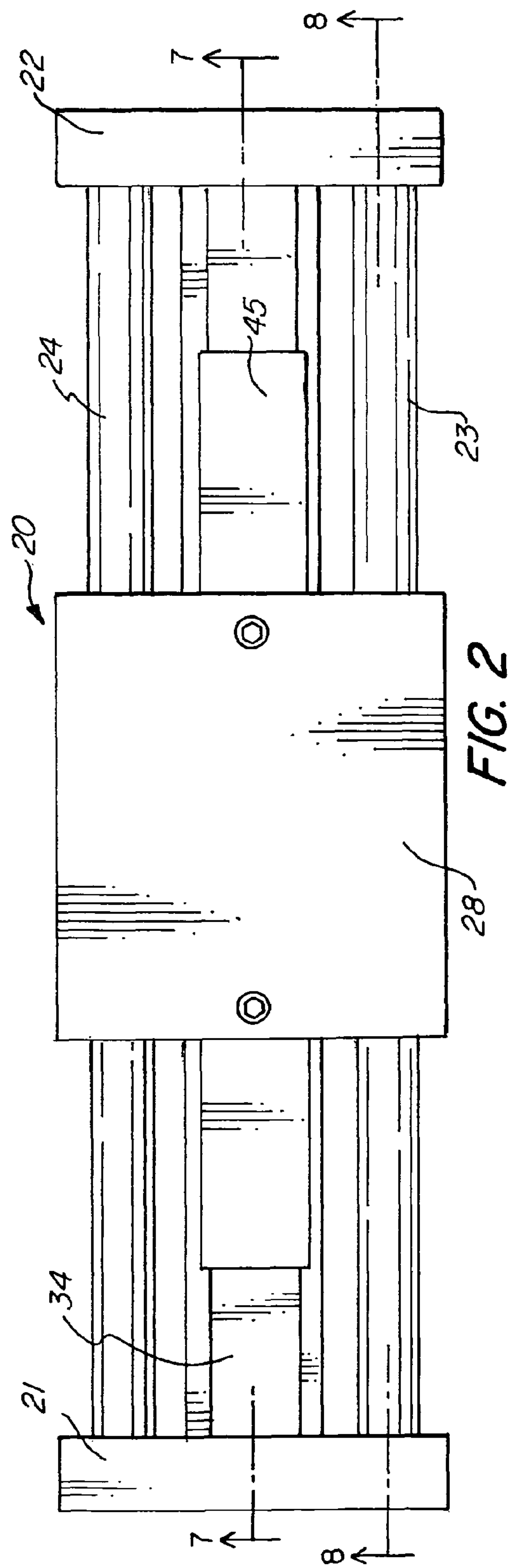
FIG. 2 is a top plan view of FIG. 1.
Figure 3:
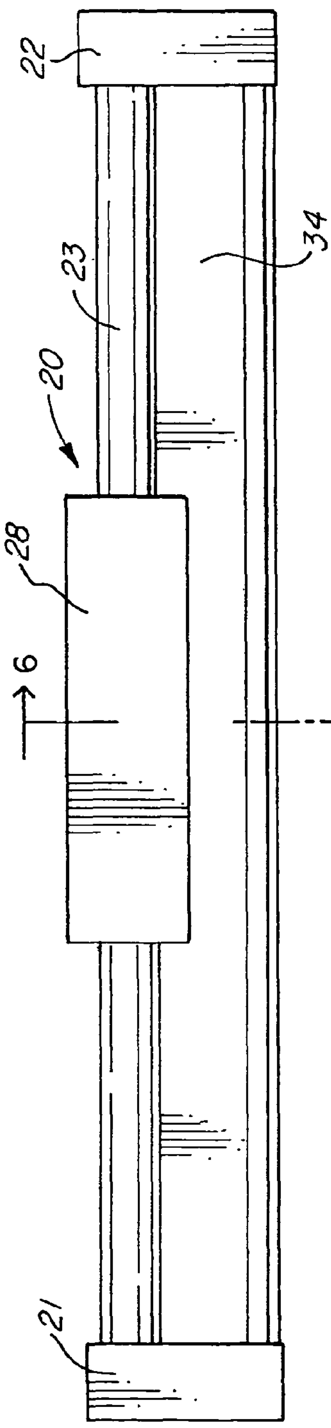
FIG. 3 is a side elevation view of FIG. 1.
Figure 4:
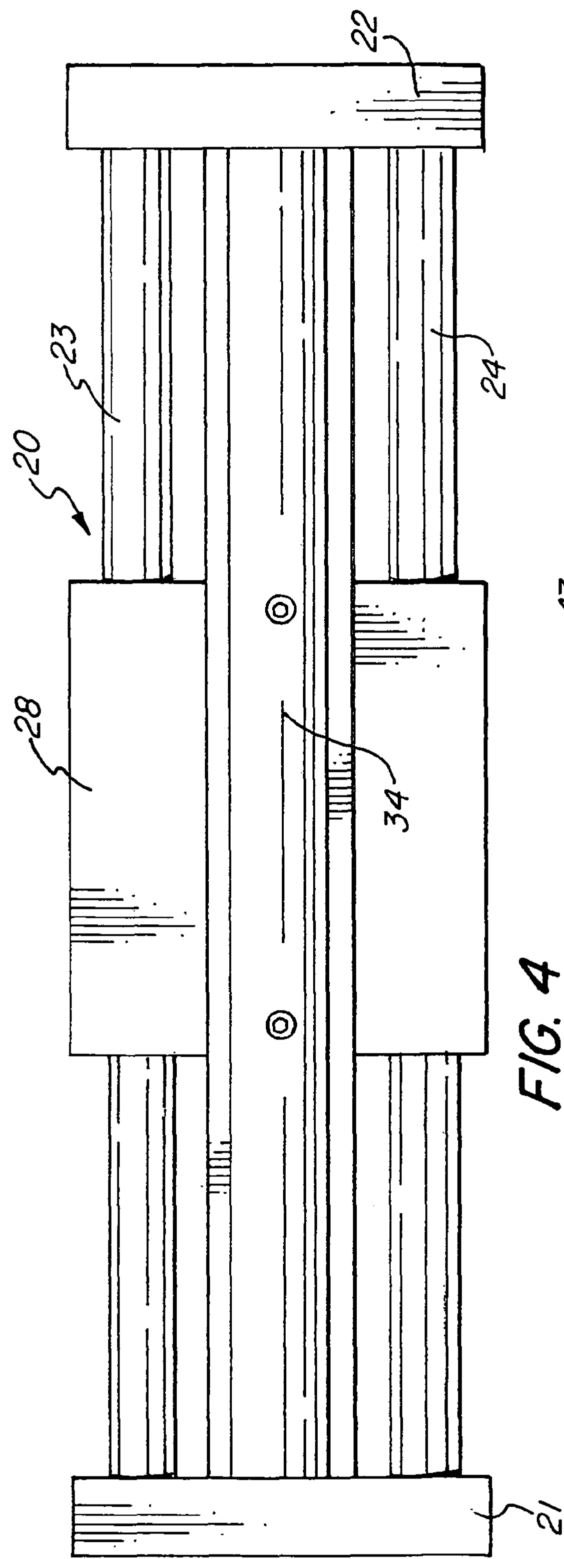
FIG. 4 is a bottom view of FIG. 1.
Figure 6:
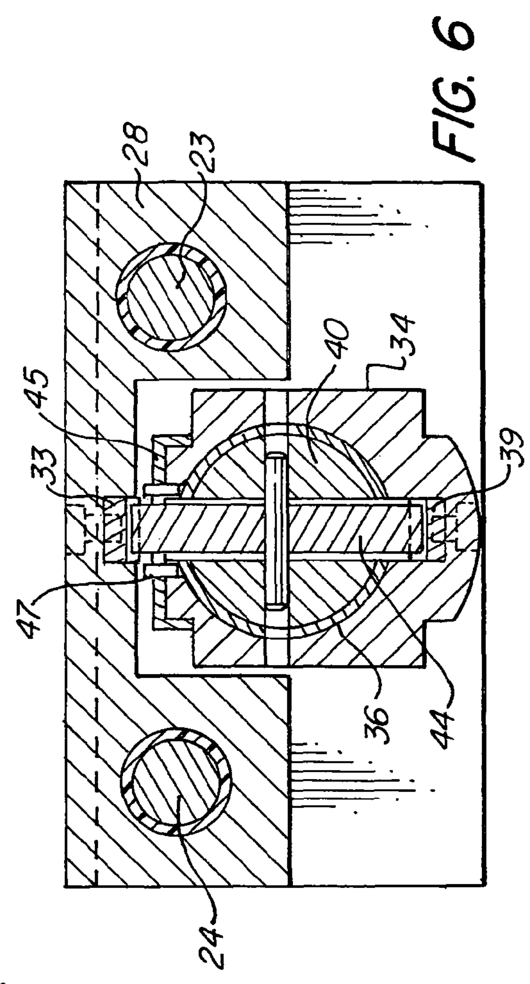
FIG. 6 is a sectional view taken along line 6-6 on FIG. 3.
Figure 5:
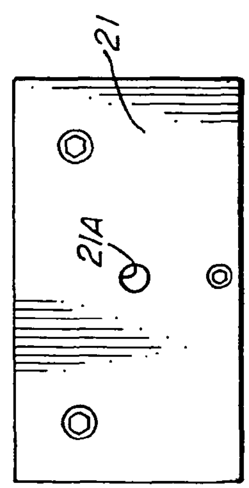
FIG. 5 is an end view of FIG. 1.
Figure 7:
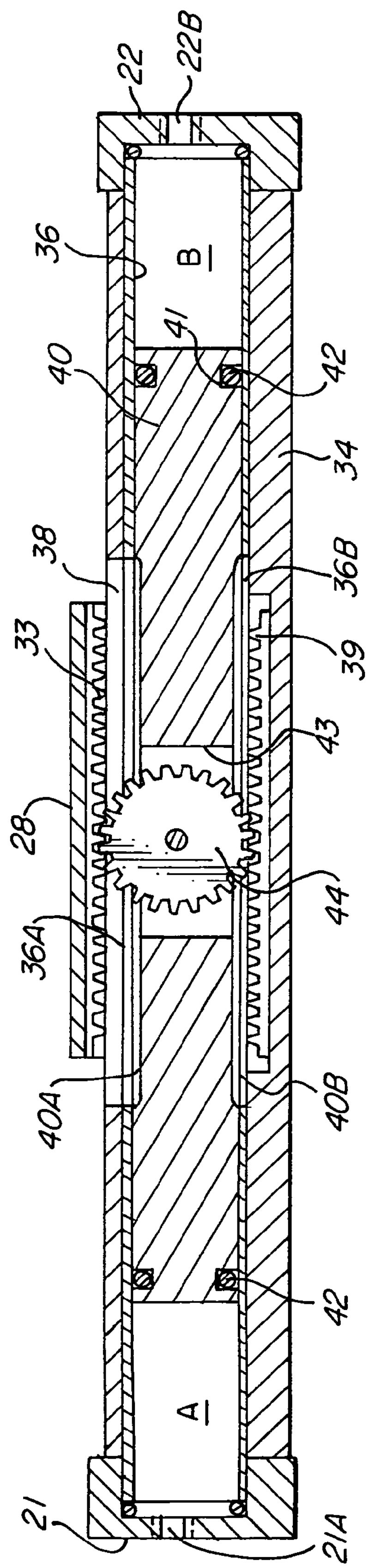
FIG. 7 is a sectional side view taken on line 7-7 on FIG. 2.

Referring to FIG. 7, it will be noted that the piston (40) is sized with a length which is less than the length of its cylinder chamber. Thus in the neutral position of the piston, as shown in FIG. 7, there is defined a void or space (A and B) on the opposite ends of the piston (40). Each of the respective end blocks (21, 22) is provided with a port opening (21A, 22A) arranged to be connected into communication with a source of a piston actuating medium (not shown), e.g. compressed air or hydraulic fluid. Completing the assembly is a cover plate (45) which is fitted over the top of the cylinder housing (34). As best shown in FIG. 10, the cover plate (45) is illustrated as a channel-shaped member which is fitted to overlie the top of the cylinder housing to function as a protective cover to keep any foreign matter from interfering with the operation of the gear wheel during the operation of the slide assembly. The cover plate (45) is provided with a window opening (45A) for accommodating the gear wheel. Adjacent to the opposed side of the window opening (45A) are a pair of spaced apart pin openings (46) arranged to register with the upright pins (47) so that in the assembled and operative position, the cover plate (45) will shift in unison with the piston (40) to keep any foreign material from interfering with the gear and rack mechanism described.

While the slide assembly as illustrated utilizes a tubular cylinder (36) to define the piston chamber (37), it will be understood that the housing bore (35), if desired, could function as the means for defining the piston chamber. However, a tubular cylinder (36) is preferred.

Figure 11:
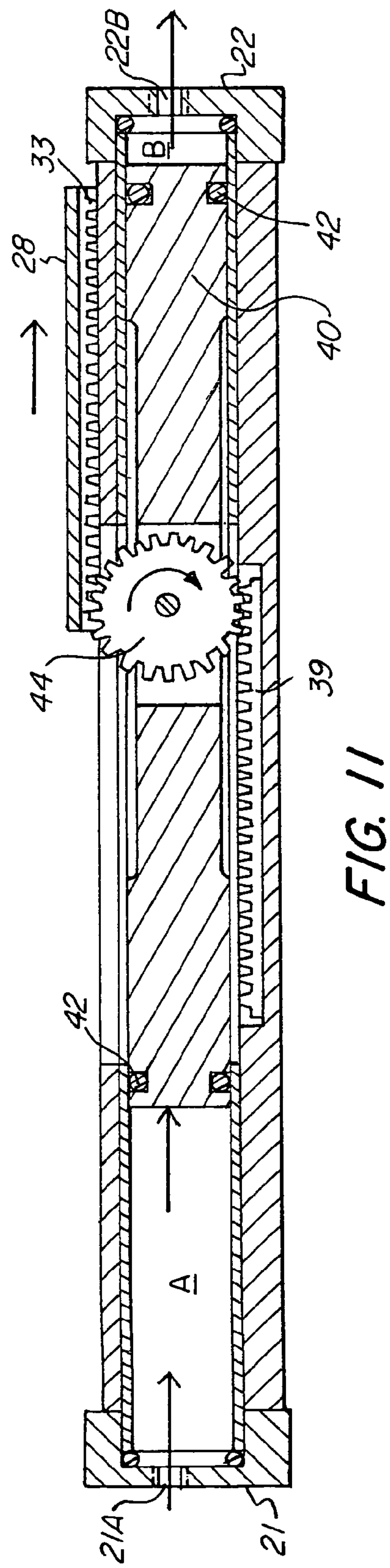
FIG. 11 is a sectional side view of the piston housing illustrating the related component parts in one extreme operating position.
Figure 12:
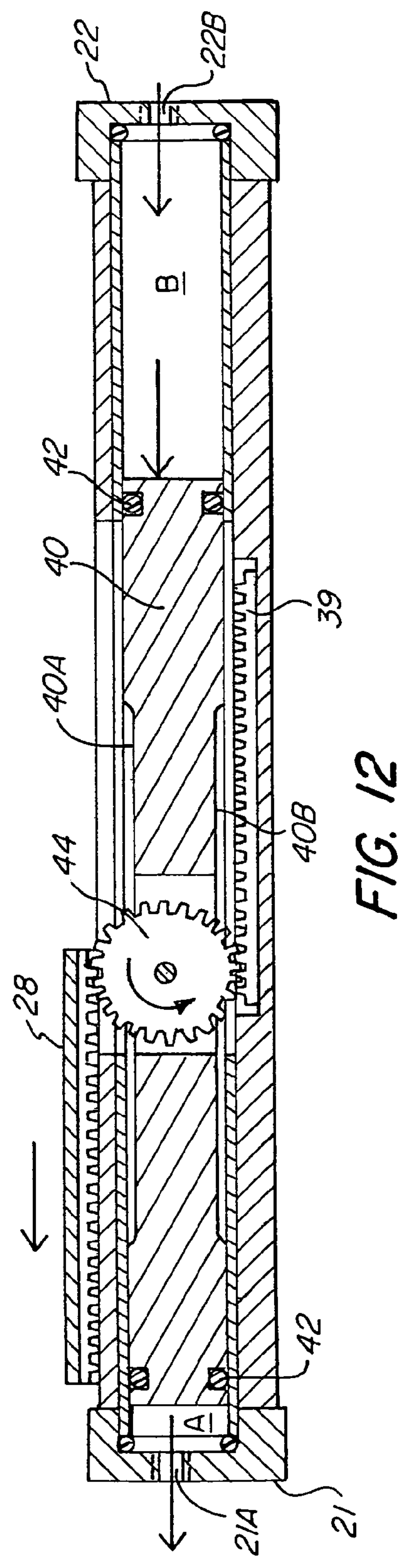
FIG. 12 is a sectional side view of the piston housing similar to FIG. 11, but showing its relative component parts in the other extreme position.

With a source of an actuating medium, e.g. compressed air, properly connected to the ports (21A, 22B), of the respective end blocks (21, 23), the operation of the machine slide assembly (20) is as follows:

With the slide assembly in its neutral position as shown in FIG. 7, the introduction of the actuating medium into Chamber A of the piston chamber (37) will cause the piston (40) to shift or be displaced to the right as indicated in FIG. 11. In doing so, the air in Chamber B is evacuated or vented through port (21B). As the piston is shifted to the right, the gear (44) is also linearly translated and rotated in a clockwise direction which is transmitted to gear rack (33) to shift the slide block (28) to its extreme right position as viewed in FIG. 11. Upon the slide reaching its extreme right position, the flow of the actuating medium is reversed whereby the actuating medium is directed to inlet port (21B) to force the piston to be displaced toward the extreme left position as illustrated in FIG. 12. In doing so, the medium in chamber A is evacuated or vented through port (21A). The shifting or displacement of the piston (40) toward its extreme left position, as illustrated in FIG. 12, causes the gear (44) to rotate in a counterclockwise direction causing the gear rack (33) to be linearly shifted to the extreme left position. Thus as the piston is reciprocated by the pressure of the fluid actuating medium operating on the respective opposite ends of the piston (40), the slide (28) is shifted over a linear distance substantially equal to the length of the cylinder housing.

It will be understood that the source of the actuating medium is provided with suitable known control means for directing the actuating fluid to one end or the other of the piston for effectively controlling the reciprocal movement of the piston within the piston chamber as herein described.

With the slide assembly herein disclosed, the linear displacement of the slide (28) is substantially enhanced over previously known slides wherein the linear displacement distance of the slide was limited to the stroke of a piston in a 1 to 1 ratio. With the above described slide assembly, the linear displacement of the slide is greater than the 1 to 1 ratio limitation of previously known slides. With the slide construction herein described, the linear displacement of the slide (28) is substantially equal to the circumferential or angular distance that the gear is permitted to rotate along its fixed rack plus the linear displacement of the gear. Thus, the overall linear distance transversed by the slide of the present invention, is twice the linear displacement of the prior slides actuated simply by displacement of a piston within its cylinder.

While the invention has been described with respect to the described embodiment, other variations and modifications can be made without departing from the spirit or scope of the invention.

What is claimed is:

1. A machine tool slide assembly comprising:

opposed end supports, a pair of spaced apart guides and an elongated cylinder defining a cylinder chamber interconnected between said end supports, a reciprocating piston slidably disposed within said cylinder chamber, a slide mounted on said guides to slide there along, and drive means moving with said reciprocating piston and interconnected between said piston and said slide for reciprocating said slide along said guide over a linear distance which is greater than the linear displacement of said piston.

2. A machine tool slide assembly comprising:

opposed end supports, a pair of spaced apart guides and an elongated cylinder defining a cylinder chamber interconnected between said end supports, a reciprocating piston slidably disposed within said cylinder chamber, a slide mounted on said guides to slide there along, and a drive means interconnected between said piston and said slide for reciprocating said slide along said guide over a linear distance which is greater than the linear displacement of said piston; and wherein said drive means include a gear having external gear teeth circumferentially spaced about the outer periphery thereof rotatably journaled to said piston whereby said piston and gear are linearly displaced within said cylinder chamber as said piston is actuated.

3. A machine tool slide as defined in claim 2 and including a gear rack fixedly connected to said cylinder, said gear rack being in meshing relationship with said gear, and a complementary movable gear rack connected to said slide for movement therewith, and said moveable gear rack being in meshing relationship with said gear whereby said slide reciprocally transverses a linear distance which is greater than the linear displacement of said piston.

4. A machine tool slide assembly as defined in claim 3 wherein said piston has a slot intermediate the opposed ends thereof, said gear being rotatably journaled to said piston within said slot, and said fixed rack being fixed adjacent to said slot and between the opposed ends of said cylinder.

5. A machine tool slide assembly comprising:

a pair of spaced apart end supports, a pair of guide members spaced apart, parallel relationship interconnected between said pair of end supports, a cylinder housing having an elongated cylinder chamber therein, said cylinder housing being interconnected between said end supports, a piston slideably disposed within said cylinder chamber for reciprocating therein, said piston having a slotted opening extending transversely there through, a gear rotatably journaled to said piston within said slotted opening of said piston, said cylinder housing having a complementary slotted opening disposed in alignment with said slotted opening of said piston, whereby an outer peripheral portion of said gear projects beyond said aligned slotted openings of said piston and cylinder housing, a fixed gear rack secured to said cylinder housing internally thereof disposed in meshing relationship with said gear, a slide mounted on said guide members for reciprocal movement there along, and a slide rack mounted on said slide to move in unison therewith, said slide rack being disposed in meshing relationship with said gear for linearly reciprocating said slide as said piston is actuated whereby the linear displacement of said slide is greater than the linear displacement of said piston within said chamber.

6. A drive mechanism for a machine tool slide comprising:

a housing defining an elongated cylinder chamber, an elongated piston slidably disposed within said cylinder chamber to reciprocate therein upon the actuation of said piston, said piston having a linear length which is less than the linear length of said piston chamber, said piston having a slotted opening extending transversely through said piston, a gear rotatably journaled to said piston within said slotted opening, a gear rack fixed to said housing adjacent to said slotted opening of said piston, said gear having an arcuate portion of its circumference extending beyond the outer surface of said piston, and said gear rack fixed to said housing being disposed in meshing relationship with said gear whereby said gear is simultaneously rotated and linearly displaced in one direction or the other as said piston is reciprocated within said cylinder chamber.

7. A drive mechanism as defined in claim 6 and including a movable rack disposed in meshing relationship with said gear whereby the linear displacement of said movable rack is greater than the linear displacement of said piston within said cylinder chamber.

8. A machine tool slide assembly comprising:

opposed end supports, guide means connected to and between said opposed end supports, a cylinder housing defining a cylinder chamber disposed between said opposed end supports, a slide member reciprocally mounted on said guide means for linear displacement therealong, a piston reciprocally disposed within said cylinder chamber, a gear connected to said piston and coupled to said slide member to effect linear displacement of said slide member as said piston is actuated to reciprocate within said cylinder chamber whereby the linear displacement of said slide member is greater than the linear displacement of said piston within said cylinder chamber.

9. A machine tool slide assembly as defined in claim 8 wherein said piston comprises a freely displaceable elongated member having a linear length which is less than the linear length of said cylinder chamber.

10. A machine tool slide assembly comprising:

opposed end supports, guide means connected to and between said opposed end supports, a cylinder housing defining a cylinder chamber disposed between said opposed end supports, a slide member reciprocally mounted on said guide means for linear displacement therealong, a piston reciprocally disposed within said cylinder chamber, means connecting said piston in driving relationship with said slide member to effect linear displacement of said slide member as said piston is actuated to reciprocate within said cylinder chamber whereby the linear displacement of said slide member is greater than the linear displacement of said piston within said cylinder chamber, wherein said piston comprises a freely displaceable elongated member having a linear length which is less than the linear length of said piston chamber, and wherein said piston includes a slotted opening extending therethrough, a gear rotatably mounted to said piston within said slotted opening, a slide gear rack connected to said slide for movement in unison therewith, a fixed gear rack connected to said cylinder housing, said slide gear rack and said fixed gear rack being disposed in meshing relationship with said gear, whereby the linear displacement of said slide along said guide mean is greater than the linear displacement of said piston within said cylinder chamber upon the actuation of said piston.

11. A machine tool slide assembly as defined in claim 10 including a cover plate overlying said cylinder housing, said cover plate having a window opening in alignment with said slotted opening for accommodating a projecting arcuate portion of said gear extending therethrough for meshing with said slide gear rack, a means for connecting said cover plate to said piston for moving in unison therewith as said piston is actuated, whereby said cover plate prohibits any foreign matter from interfering with said gear and associated meshing gear racks.

12. A machine tool slide assembly as defined in claim 11 wherein said connecting means include a pair of opposed pin openings adjacent to said window opening of said cover plate, and a pair projecting pins connected to said piston, said projecting pins being arranged to register with said pin openings of said cover plate.

* * * * *